United States Patent
Yao et al.

(10) Patent No.: US 11,412,462 B2
(45) Date of Patent: Aug. 9, 2022

(54) ENHANCED POWER MANAGEMENT FOR WIRELESS COMMUNICATIONS

(71) Applicant: Intel Corporation, Santa Clara, CA (US)

(72) Inventors: Zhen Yao, San Jose, CA (US); Suraj Sindia, Hillsboro, CA (US); Songnan Yang, San Jose, CA (US); John M. Roman, Hillsboro, CA (US); Robert Paxman, Hillsboro, CA (US); Walid El Hajj, Antibes (FR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/604,898

(22) PCT Filed: Mar. 30, 2018

(86) PCT No.: PCT/US2018/025358
§ 371 (c)(1),
(2) Date: Oct. 11, 2019

(87) PCT Pub. No.: WO2018/191036
PCT Pub. Date: Oct. 18, 2018

(65) Prior Publication Data
US 2020/0389856 A1 Dec. 10, 2020

Related U.S. Application Data

(60) Provisional application No. 62/485,697, filed on Apr. 14, 2017.

(51) Int. Cl.
*H04W 52/36* (2009.01)
*H04B 17/12* (2015.01)
(Continued)

(52) U.S. Cl.
CPC ........ *H04W 52/367* (2013.01); *H04B 1/3838* (2013.01); *H04B 17/12* (2015.01); *H04B 17/21* (2015.01); *H04B 17/26* (2015.01)

(58) Field of Classification Search
CPC ... H04W 52/367; H04W 52/18; H04W 52/36; H04W 52/16; H04W 52/346;
(Continued)

(56) References Cited

U.S. PATENT DOCUMENTS 9,214,977 B2 * 12/2015 Drucker .............. H04W 52/288
9,338,679 B1 * 5/2016 Sheppard ............. H04W 52/36
(Continued)

OTHER PUBLICATIONS

International Search Report and Written Opinion for PCT Application No. PCT/US2018/025358, dated Jul. 17, 2018, 11 pages.

*Primary Examiner* — Un C Cho
*Assistant Examiner* — Rasha K Fayed
(74) *Attorney, Agent, or Firm* — Eversheds Sutherland (US) LLP

(57) ABSTRACT

This disclosure describes systems, methods, and devices related to enhanced power management. A device may identify one or more first radio frequency waves received from a second device during a time period. The device may determine a first transmission power associated with a first radio frequency wave of the one or more first radio frequency waves. The device may determine a time-averaged power density associated with the one or more first radio frequency waves. The device may determine a transmission power limit. The device may send an indication of the transmission power limit to the second device.

19 Claims, 11 Drawing Sheets

(51) Int. Cl.
*H04B 17/21* (2015.01)
*H04B 17/26* (2015.01)
*H04B 1/3827* (2015.01)

(58) Field of Classification Search
CPC . H04W 52/143; H04W 52/42; H04W 52/146; H04W 52/50; H04W 52/30; H04W 52/243; H04W 52/288; H04W 52/365; H04W 52/226; H04W 52/06; H04W 52/281; H04W 16/14; H04W 24/08; H04W 24/10; H04W 88/06; H04W 4/00; H04L 5/14; H04M 2250/12; H04B 17/21; H04B 17/12; H04B 17/26; H04B 17/18; H04B 17/102; H04B 1/3838

See application file for complete search history.

(56) References Cited

U.S. PATENT DOCUMENTS

| | | | | |
|---|---|---|---|---|
| 2005/0213177 | A1* | 9/2005 | Abe | G02B 26/125 359/206.1 |
| 2009/0268795 | A1* | 10/2009 | Gernegross | H04Q 11/04 375/222 |
| 2011/0002411 | A1* | 1/2011 | Forenza | H04L 1/0003 375/267 |
| 2011/0195699 | A1* | 8/2011 | Tadayon | H04W 48/02 455/418 |
| 2012/0021707 | A1* | 1/2012 | Forrester | H04W 52/281 455/103 |
| 2012/0093078 | A1* | 4/2012 | Perlman | H04B 7/0434 370/328 |
| 2012/0282942 | A1* | 11/2012 | Uusitalo | H04W 16/14 455/452.2 |
| 2012/0296260 | A1* | 11/2012 | Vizethum | A61N 5/062 604/20 |
| 2013/0281148 | A1* | 10/2013 | Seyama | H04W 52/30 455/522 |
| 2014/0018059 | A1* | 1/2014 | Noonan | H04W 16/32 455/419 |
| 2014/0162574 | A1* | 6/2014 | Rousu | H04W 52/42 455/78 |
| 2014/0235287 | A1* | 8/2014 | Maltsev | H04B 7/0452 455/522 |
| 2014/0274190 | A1* | 9/2014 | Lu | H04W 52/367 455/522 |
| 2014/0370830 | A1* | 12/2014 | Steer | H04W 52/288 455/127.1 |
| 2015/0015448 | A1* | 1/2015 | Almog | H01Q 21/24 343/810 |
| 2015/0022271 | A1 | 1/2015 | Winiecki et al. | |
| 2015/0215874 | A1 | 7/2015 | Chen et al. | |
| 2017/0064641 | A1* | 3/2017 | Logan | H04W 52/18 |
| 2017/0069969 | A1 | 3/2017 | Black et al. | |
| 2017/0194996 | A1* | 7/2017 | Shi | H04W 52/18 |
| 2017/0331670 | A1* | 11/2017 | Parkvall | H04L 41/0233 |
| 2017/0332333 | A1* | 11/2017 | Santhanam | H04W 52/367 |
| 2018/0103381 | A1* | 4/2018 | Ramamurthi | H04W 36/0016 |
| 2018/0167897 | A1* | 6/2018 | Sampath | H04W 52/365 |
| 2018/0287650 | A1* | 10/2018 | Mercer | H04W 52/18 |
| 2020/0044333 | A1* | 2/2020 | Kikuma | H01Q 3/02 |

\* cited by examiner

ENHANCED POWER MANAGEMENT FOR WIRELESS COMMUNICATIONS

CROSS-REFERENCE TO RELATED APPLICATION(S)

This application is a U.S. National Stage Application under 35 U.S.C. 371 and claims the priority benefit of International Application No. PCT/US2018/025358, filed Mar. 30, 2018, which claims the benefit of U.S. Provisional Application No. 62/485,697, filed Apr. 14, 2017, entitled "Dynamic Radio Frequency Transmitting Power Management," the disclosures of which are incorporated by reference as if set forth in full.

TECHNICAL FIELD

This disclosure generally relates to systems and methods for wireless communications and, more particularly, to enhanced power management.

BACKGROUND

Wireless devices are becoming widely prevalent and are increasingly requesting access to wireless channels. The growing density of wireless deployments require increased network and spectrum availability. This may in turn increase the exposure to electromagnetic energy.

DETAILED DESCRIPTION

Figure 1:
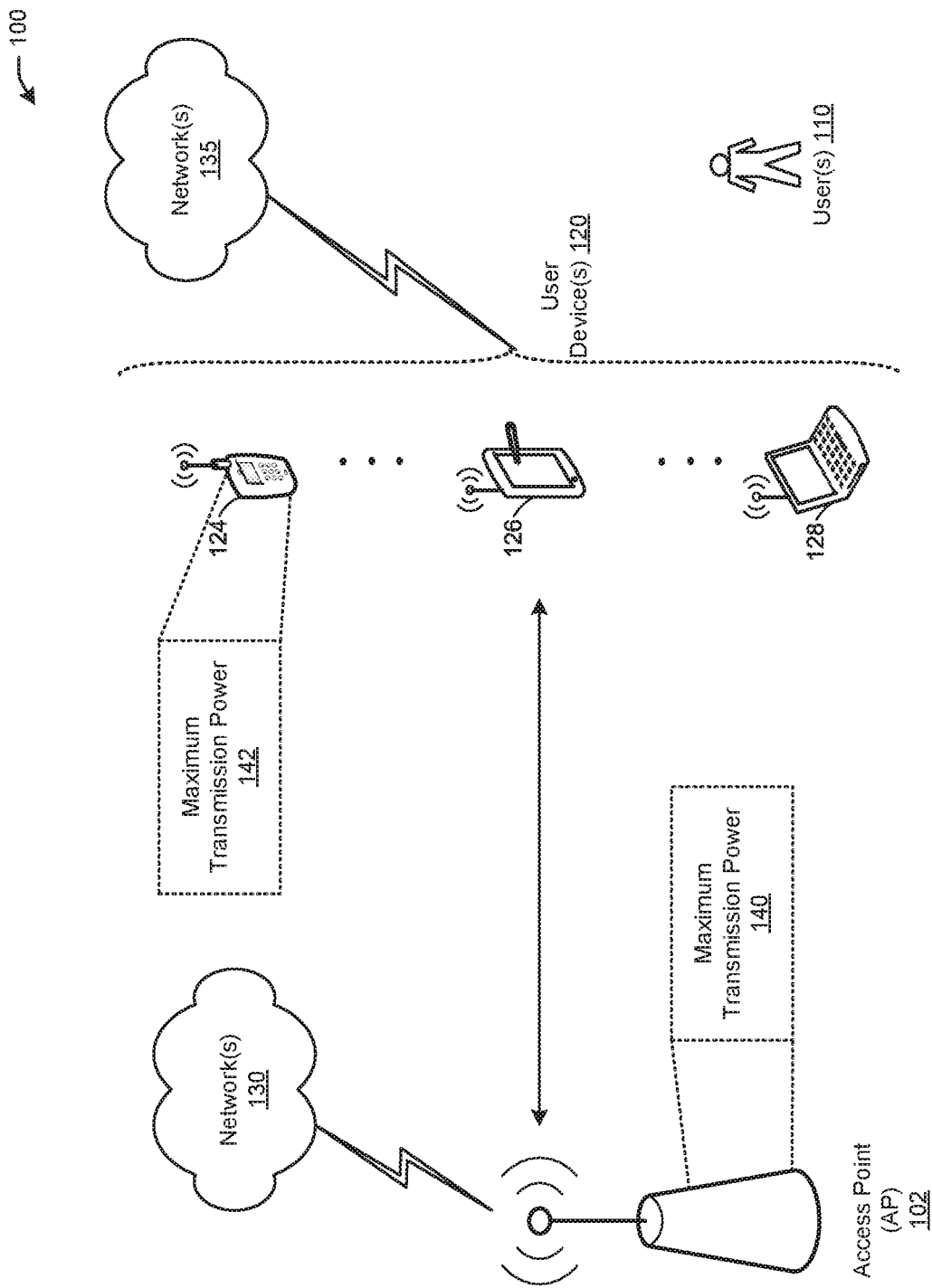
FIG. 1 depicts a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In wireless communications, it may be desirable to limit power density in a given geographic area. For example, because devices may emit electromagnetic energy, power density limits on devices may limit the amount of such energy. The United States Federal Communication Commission (FCC), for example, regulates human exposure to radio frequency electromagnetic fields by requiring limits on field strength and power density of device transmitters operating in certain frequency bands.

To comply with power density limits and enhance control of device transmissions, devices may use power sensing and/or management methods, which may consider measured spatial values of device transmission power. However, some power management methods relying on measured spatial values of device transmission power may result in values with little margin with respect to the regulatory limits. For example, an FCC power density limit is 1 $mW/cm^2$, and some client devices operate at a power density value (e.g., of about 95%) of the limit at typical operating modes, which may therefore limit the maximum data uplink/downlink bandwidth that devices may support.

Therefore, it may be desirable to enhance device power management using transmission power sensing and control.

Example embodiments of the present disclosure relate to systems, methods, and devices for enhanced power management for wireless communications.

In one or more embodiments, power density sensing and measuring may be enhanced, and may facilitate radio frequency limit compliance for portable client devices such as laptops, tablets, "2-in-1 s," and phones in millimeter wave (mm-wave) applications such as WiGig, 5G, and others. By enhancing power density/radio frequency exposure testing of wireless device transceivers (e.g., radio frequency transceivers), the output margins of such transceivers may be improved with respect to regulatory limits on power density/radio frequency exposure.

In one or more embodiments, an enhanced power management system may control a transmission power of a device based on the device's power density. A test device or system, for example, may identify radio frequency waves from a device under test. Each radio frequency wave may be associated with a beam direction, and each radio frequency wave may be associated with a respective transmission power. Using the respective transmission power of the radio frequency waves for a given beam direction over a time period, the test device or system may determine a time-averaged power density of the radio frequency waves (e.g., an average power density of radio frequency waves over a time interval). If the time-averaged power density is above a transmission power limit (e.g., a regulatory limit), the test device or system may determine a maximum transmission power limit using the respective transmission power of the radio frequency waves, the distance of the device under test from where the radio frequency waves are received, and the beam direction. The test device or system may send an indication to the device under test to indicate the determined maximum transmission power limit. Such enhanced power management control may allow transmitting devices to avoid operating at transmission power levels above regulatory limits, and also to avoid operating so close to such limits that there is very little operating margin for transmitting devices before becoming non-compliant by operating above power density limit(s). The test device or system may store maximum transmission power limits in a table which may associated transmission power with power density.

In one or more embodiments, one or more devices may be used to sense and calibrate power density of device transmissions. For example, a device under test may be measured by one or more devices and/or equipment. Test equipment may receive device transmissions from a test device at distance (e.g., a distance from a proximity sensor). Using received device transmissions, the testing equipment may determine a power density at a given time by matching the transmission power to a power density in a table (e.g., a look-up table). Over a time period, the test equipment may determine a time-averaged power density. If the time-averaged power density is less than a limit (e.g., a regulatory limit), the test equipment may determine a maximum transmission power limit. The test equipment also may set maximum transmit power and send an indication of that maximum transmit power to the device under test.

In one or more embodiments, enhanced power management may use time and area averaging. Time and area averaging power density sensing may impact future regulatory standards and radio frequency exposure testing of wireless devices using mm-wave portions of an electromagnetic spectrum.

In one or more embodiments, area and time averaging may extend the range of power density transmittable in client devices.

In one or more embodiments, proximity sensing may be used to enhance device power management. Proximity sensing may include an on-device system for dynamically controlling transmission power based on an estimated power density at an object near a transmitting device.

In one or more embodiments, enhanced power testing may implement a time averaging method, which may target sub-6 GHz applications (e.g., 3G/4G, Wi-Fi, etc.) in which the radio frequency exposure metric may be specific absorption rate (SAR). Using dynamic distance monitoring from one or more proximity sensors, real-time SAR may be determined and cached for time-averaged SAR tracking. Radio frequency system output power may be dynamically controlled to improve throughput without violating SAR regulatory compliance.

In one or more embodiments, an enhanced time averaging method may control device transmission power to increase the flexibility/margin in comparison to regulatory limits for field radiation exposure, and may also facilitate higher power throughput to improve user experience. A real-time calibration procedure may be used in combination with real-time proximity and output power sensing to achieve such improvements. Once calibration is completed, a table relating transmission output power to power density may be stored on a device and used to control transmission power and power density.

In one or more embodiments, targeted radiated emissions may include power density and SAR. However, enhanced power management may be extended to other radio frequency exposure limits such as electric fields, magnetic fields, and induced current densities, for example.

Device antennas may be directional, meaning an antenna may send and/or receive in specific directions, allowing for increased power (e.g., transmission power) and reduced interference. Directional antennas may include antenna weight vectors (AWVs) associated with different antenna sectors in an array. Each antenna direction may transmit or receive one or more beams. An AWV may be a vector of weights describing excitation (e.g., amplitude and phase) for each element/domain of an antenna array. An antenna may switch AWVs when sending/receiving signals.

In one or more embodiments, an enhanced time averaging method may calibrate a power transmission system to establish a relationship between transmission power and radio frequency exposure at a given measured distance from a device along a respective beam direction. When more than one beam direction is available based on a device antenna, then the calibration may be applied to each beam direction at an individual beam direction level. The relationship between transmission power and radio frequency exposure per distance and beam direction may be stored in a table (e.g., a look-up table), which may be stored on a device and used in an enhanced time averaging determination. Using measured transmission power and the table, a decision control flow may be used by a device to dynamically adjust transmission power such that, for example, a time-averaged radio frequency exposure metric may remain lower than a regulatory limit at all times in a given geographic area in which a device may be operating. For example, a device's power density may be regulated such that the power density remains within regulatory limits.

In one or more embodiments, an enhanced exposure testing and setup procedure may be applied to a device to integrate automatic time and area averaging monitoring, and functionality for distance variation measurement. The enhanced exposure testing and setup may allow devices to comply with regulatory requirements. For example, the International Commission on Non-Ionizing Radiation Protection requires SAR compliance over time periods of six minutes where SAR is averaged over the time periods. The FCC limits maximum permissible exposure (MPE) over an average time period of thirty minutes, except for portable devices intended for consumer user. Thus, enhanced exposure testing and setup may allow for improved device intelligence which may account for time and area averaging.

In one or more embodiments, enhanced power management may include steering a beam to a certain direction (e.g., $\theta$, $\phi$) by exiting various antenna phase combinations of a phased antenna array (e.g., exciting antenna sectors).

In one or more embodiments, enhanced power management may include scanning a plane orthogonal to an antenna beam direction at a fixed output power and distance (e.g., distance d) along an antenna beam direction.

In one or more embodiments, beam steering and plane scanning may cover every direction in which a beam may be sent via an antenna. Using a sufficient number of distances and output levels, a relationship table may be established to relate output power and maximum power density at a given distance in any direction corresponding to output power levels.

In one or more embodiments, given a beam direction (e.g., θ, φ), a distance (e.g., distance d), and an output power level, a maximum power density may be estimated using a table relating the variables.

In one or more embodiments, the combined time and averaging enabled by an enhanced measurement control computer/device for radio frequency exposure assessments in a test mode may facilitate device compliance with regulatory limits, and may improve power output margins against such limits. Such may improve device transmission power. Once the measurements have been performed and the table relating transmission power to power density is determined, a device may control its output to comply with regulatory power density limits.

A device may determine transmission/output power by measuring voltage, current, and resistance (e.g., Power=current×voltage, voltage=current×resistance). A device may be able to regulate that output power by, for example, determining whether a transmission/output power corresponds to a power density value that is within regulatory limits. If a device is aware of a maximum transmission power limit (e.g., associated with maintaining a time-averaged power density at or below a regulatory limit), then the device may set its transmission power according to the maximum transmission power limit and/or may throttle transmission power when appropriate.

In one or more embodiments, enhanced calibration may allow for the generation and storage of a table relating output/transmission power to power density. Once a device is able to store such a table (e.g., after calibration), the device can determine its output power and compare the corresponding power density value to a threshold (e.g., regulatory limit) value, and may adjust output/transmission power of a transmitting device to reach an acceptable power density value. Such calibration and adjustment may be performed in different antenna elements (e.g., sectors associated with different beam directions).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for dynamic RF transmitting power management, in accordance with one or more example embodiments of the present disclosure. Wireless network 100 may include one or more user device(s) 120 and one or more access point(s) (AP) 102, which may communicate in accordance with one or more communication standards, such as IEEE 802.11 communication standards, WiGig, 5G, etc. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 7:
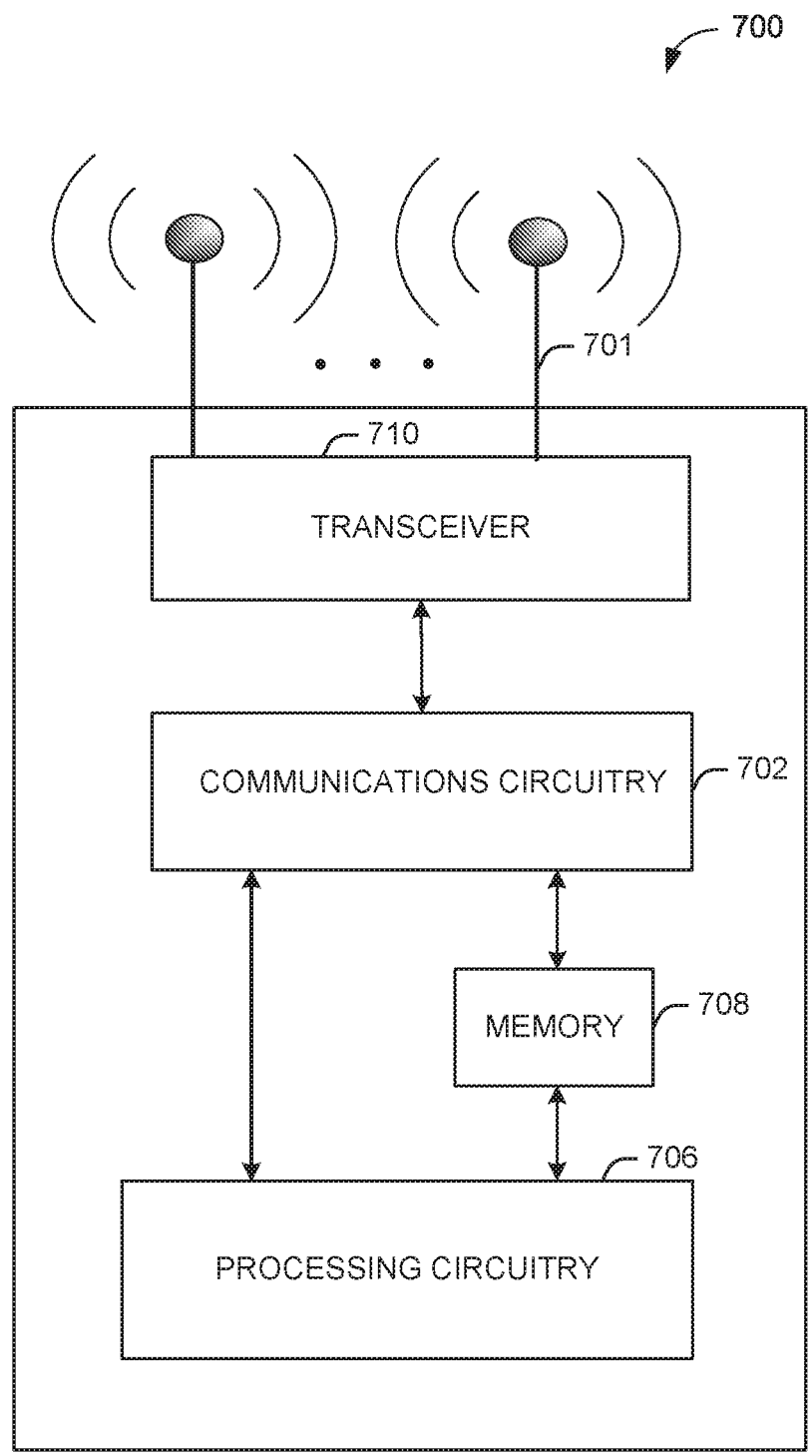
FIG. 7 depicts a functional diagram of an example communication station that may be suitable for use as a user device, in accordance with one or more example embodiments of the present disclosure.
Figure 8:
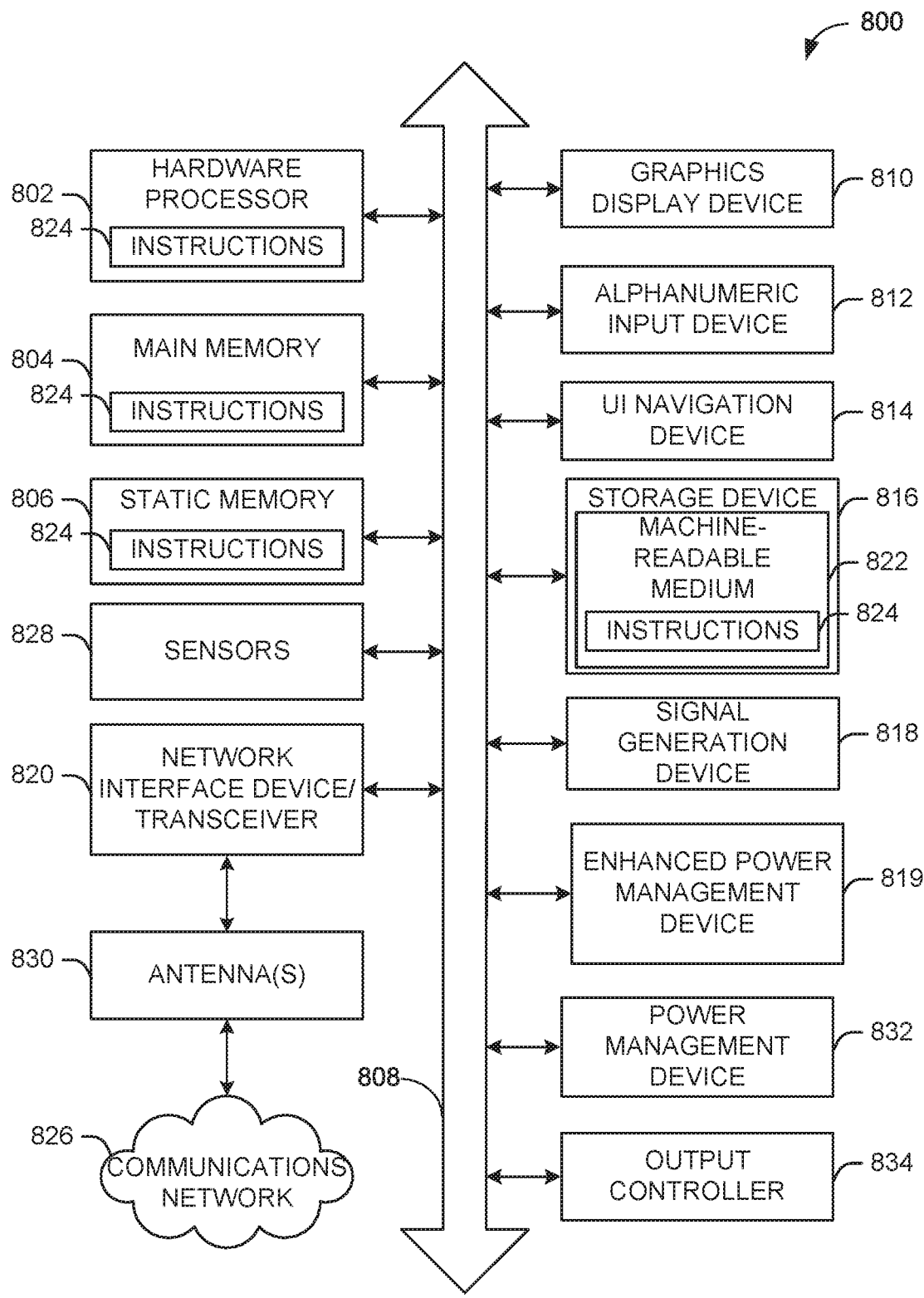
FIG. 8 depicts a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 7 and/or the example machine/system of FIG. 8.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more wireless protocols, such as Wi-Fi and/or Wi-Fi direct protocols, as standardized by the Institute of Electrical and Electronics Engineers (IEEE) 802.11 standards, or other type of wireless protocols, such as LTE, 3G, 4G, 5G, etc. In some embodiments, other protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, when an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction.

In one or more embodiments, device transmissions may be associated with an output/transmission power, which may correspond to an output density. Regulations govern power density limits, an enhanced power management may facilitate efficient device operations and compliance with power density limits.

In one or more embodiments, devices (e.g., AP 102, user device(s) 120) may transmit with a maximum transmission power (e.g., maximum transmission power 140, maximum transmission power 142). At least because regulatory limits on power density, which may correlate to transmission power, it may be beneficial to regulate transmission power of devices. The maximum transmission power of a device may be based on a transmission power limit determined based on power density regulations, for example. As transmission power is determined for a device, the device may adjust the transmission power according to a corresponding time-averaged power density associated with transmission power over a given time period. If a device's transmission power results in a time-averaged power density above a power density limit, then the device may adjust (e.g., throttle) transmission power for a time to reduce the time-averaged power density to compliant levels under power density limits.

It is understood that the above descriptions are for purposes of illustration and are not meant to be limiting.

Figure 2A:
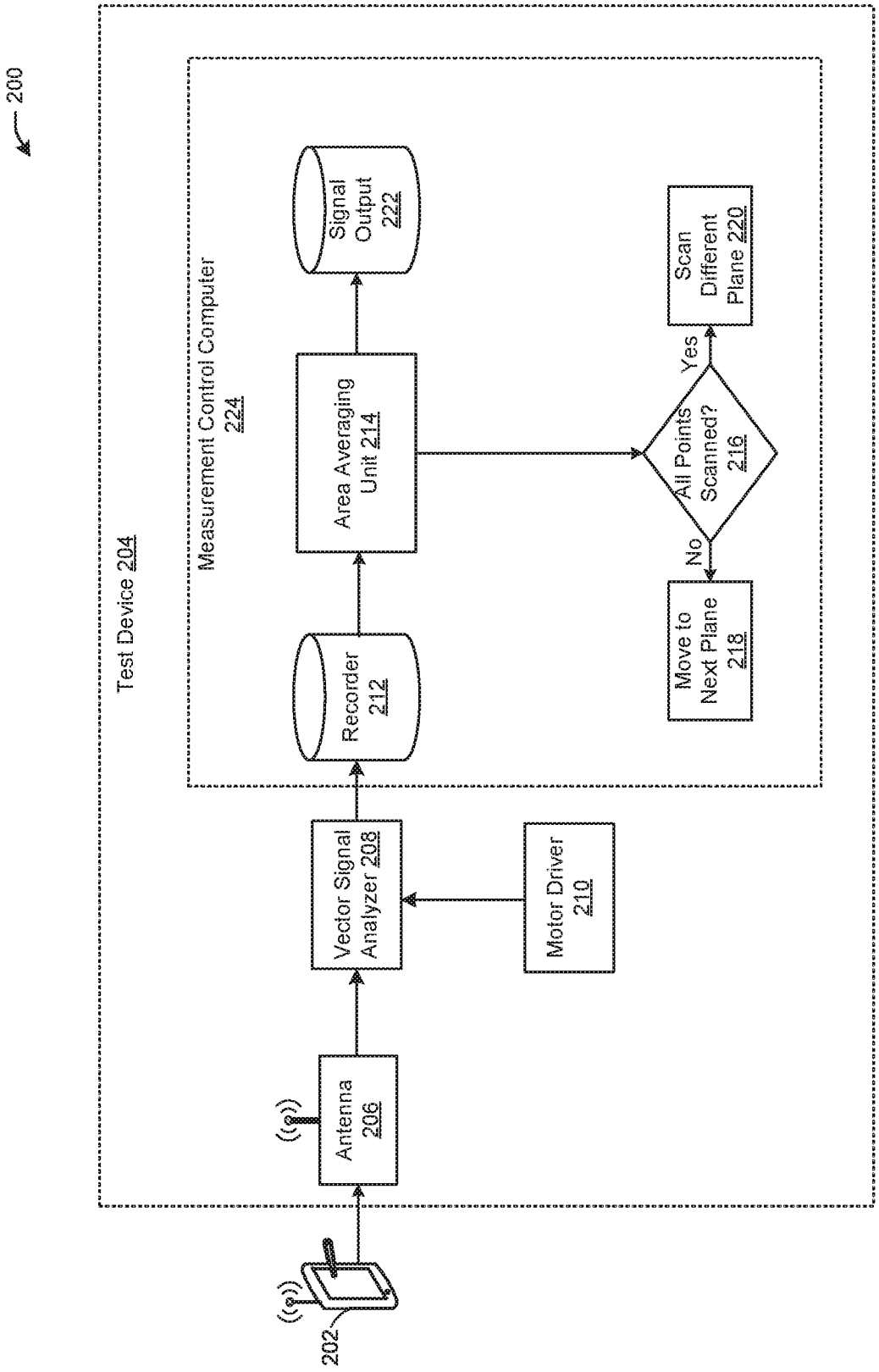
FIG. 2 depicts an illustrative calibration process, in accordance with one or more example embodiments of the present disclosure.
FIG. 2B depicts an illustrative process for enhanced power management, in accordance with one or more example embodiments of the present disclosure.

FIG. 2A depicts an illustrative calibration process 200, in accordance with one or more example embodiments of the present disclosure.

Referring to FIG. 2, a device 202 may be under test with a test device 204. Test device 204 may include one or more devices/components, such as an antenna 206 (e.g., a horn antenna), a vector signal analyzer 208, a motor driver 210, a recorder 212 (e.g., an epoch recorder), an area averaging unit 214, a unit for determining whether all points in a plane are scanned 216, a unit for moving to a next point in an X-Y axis plane 218, a unit for scanning a different plane along a z-direction 220, and a signal output unit 222. Recorder 212, area averaging unit 214, unit for determining whether all points in a plane are scanned 216, unit for moving to a next point in an X-Y axis plane 218, unit for scanning a different plane along a z-direction 220, and signal output unit 222 may be part of a measurement control computer 224.

In one or more embodiments, calibration process 200 may be used to determine a relationship between instantaneous output power (e.g., from device 202) and maximum power density. Antenna 206 may receive signals/waveforms from device 202, and may pass the signals to vector signal analyzer 208, which may be electrically coupled to motor driver 210. The one or more signals may be recorded by recorder 212, and area averaging unit 214 may determine the time-average of one or more received signals over an area. For example, the time-average may be determined according to the equation:

$$\int\int_{x,y=0,0}^{x=X,y=Y} s(x, y, t) dx\, dy = S_{XY},$$

where s(x, y, t) may represent a signal over an x-direction and y-direction over time. If the unit for determining whether all points in a plane are scanned 216 determines that not all points in a plane have been scanned (e.g., have been measured for output power, distance to device 202, beam direction, etc.), then the unit for moving to a next point in an X-Y axis plane 218 considers another point in the same X-Y axis plane until the unit for determining whether all points in a plane are scanned 216 determines that all points in a plane have been scanned. Once all points in a plane (e.g., an X-Y axis plane) have been scanned, the unit for scanning a different plane along a z-direction 220 may scan a different plane along another direction (e.g., a z-direction). Once all points have been scanned across each plane, the signal output unit 222 may determine a maximum signal output, which may represent the maximum transmission power which device 202 may be able to transmit given a particular beam and transmission distance. The maximum transmission power information may be provided to device 202 (e.g., from test device 204) so that, for example, the transmission power of device 202 may be controlled using enhanced power management.

In one or more embodiments, other testing may be used to enhance power management of wireless device transceivers. However the power sensing testing is performed to determine a relationship between power density and transmission output, once the relationship is determined, wireless device transceiver output may be regulated using data relating power density and transmission output.

It is understood that the above descriptions are for purposes of illustration and are not meant to be limiting.

Figure 2B:
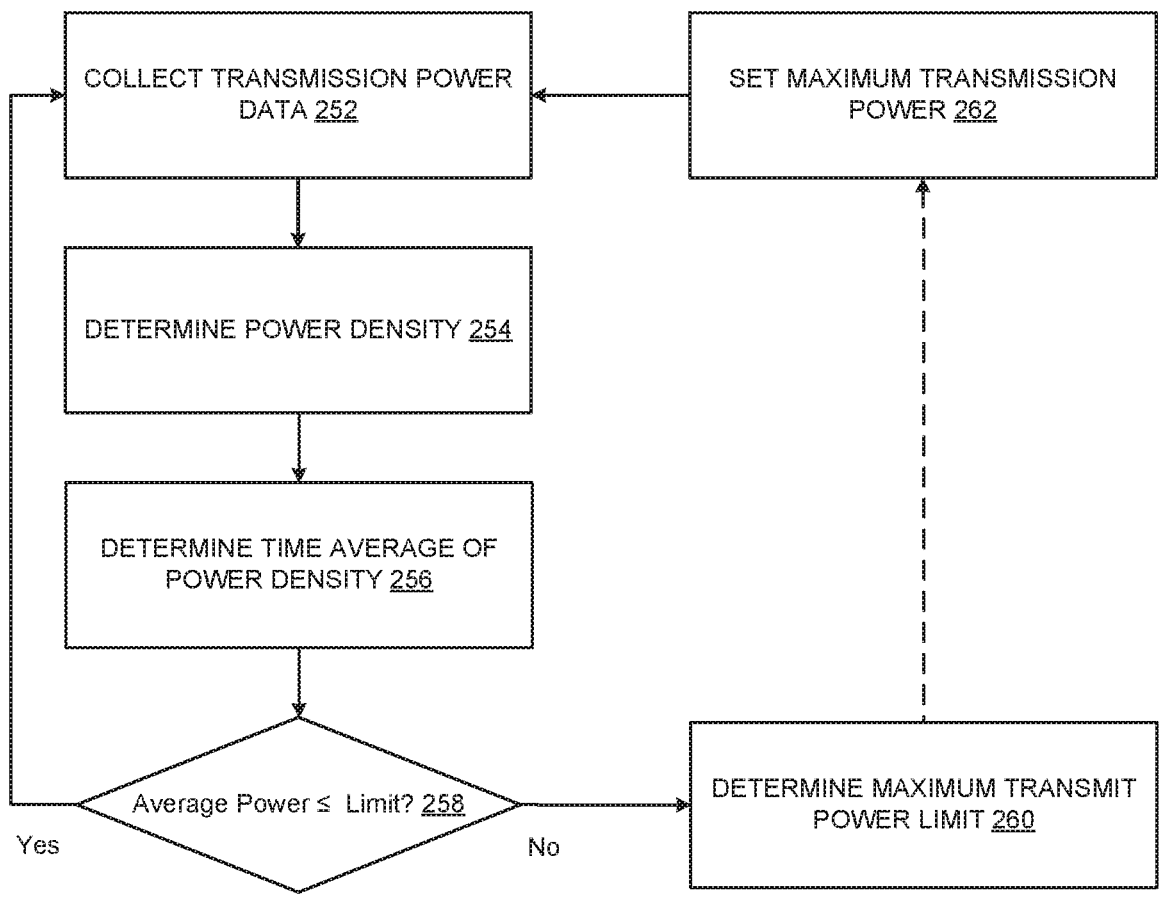

FIG. 2B depicts an illustrative process 250 for enhanced power management, in accordance with one or more example embodiments of the present disclosure.

In one or more embodiments, a device (e.g., test device 204 of FIG. 2A) may collect transmission power data at block 252. Transmission power data may be collected from one or more signals/waves sent by another device (e.g., device 202 of FIG. 2A) by a radio front end (e.g., antenna 206 of FIG. 2A). At block 252, a user's distance (e.g., a distance to device 202 of FIG. 2A) also may be collected (e.g., using one or more sensors, such as proximity sensors and/or other sensors). The transmission power data may include respective transmission power associated with radio frequency waves for one or more beams.

In one or more embodiments, at block 254, a device (e.g., test device 204 of FIG. 2A) may determine power density of the one or more signals and waves received from another device. To determine the instantaneous power density of a given signal at a given time, a look-up table may be used to provide the information. For example, a look-up table may relate transmission power to power density at a given distance. The look-up table may be based on one or more calibration measurements (e.g., as performed by test device 204 of FIG. 2B).

In one or more embodiments, at block 256, a device (e.g., test device 204 of FIG. 2A) may determine a time average of power density (e.g., time-averaged power density) over a given time period. The time-averaged power density may be determined by the equation:

$$P_{ave} = \frac{1}{T} \int_{T_0-T}^{T_0} P_{ins} dt,$$

where $P_{ins}$ is an instantaneous transmission power, and a time interval of the time-averaged power density is between $T_0$ and T. The time-averaged power density may be determined for one or more beams. For example, a time-averaged power density may be determined for a respective beam or multiple respective beams, or a time-averaged power density may be determined using transmission power data from multiple beams.

In one or more embodiments, at block 258, a device (e.g., test device 204 of FIG. 2A) may determine whether the time-averaged power density $P_{ave}$ is less than or equal to a transmission power limit (e.g., a regulatory limit). If so, the device continue to collect transmission power and distance data at block 252. If $P_{ave}$ is greater than the transmission power limit, however, the device may determine a maximum transmission power limit at block 260. The maximum transmission power limit $P_{max}$ at $T_0+1$ may be based on instantaneous power density at the beginning of a time averaging window $T_0-T$, and based on a current user distance along an antenna beam direction.

In one or more embodiments, at block 262, a device (e.g., test device 204 of FIG. 2A) may set the maximum transmission power limit $P_{max}(T_0+1)$. The device may send an indication of the maximum transmission power limit to a test device (e.g., device 202 of FIG. 2A) to enable enhanced power management control. The device may also store the maximum transmission power limit value in a table relating the maximum transmission power limit value to other data such as transmission distance and power density. Data in such a table may be used to determine power density of one or more device transmissions (e.g., at block 254). No matter how transmission power is sensed, the relationship between power density and transmission power is determined, and/or the maximum transmission power limit is communicated to a device, once the relationship is determined, a maximum transmission power limit may be determined using the determined relationship and used by a device to control transmission power and associated power density.

In one or more embodiments, process 250 for enhanced power management with the time averaging method may calibrate a power transmitting system (e.g., test device 204 of FIG. 2A) to build a relationship between transmission power and radio frequency exposure at a given measurement distance along one or more beam directions associated with a transmission antenna (e.g., an antenna of device 202 of FIG. 2A). The information relating transmission power and power density may be stored in a look-up table and used in the algorithm (e.g., at block 254). Using process 250 for enhanced power management may allow for decision control for dynamically adjusting transmission power such that the time-averaged power density (e.g., a radio frequency exposure metric) may always be lower than a regulatory limit at a location where a device is operating.

In one or more embodiments, process 250 for enhanced power management facilitates a testing and setup procedure to integrate the monitoring of automatic time and area averaging associated with device transmission power. Also, measurement distance variation may be integrated into process 250 to accommodate regulatory requirements and to allow for improved device intelligence which may account for time and/or area averaging.

It is understood that the above descriptions are for purposes of illustration and are not meant to be limiting.

Figure 3A:
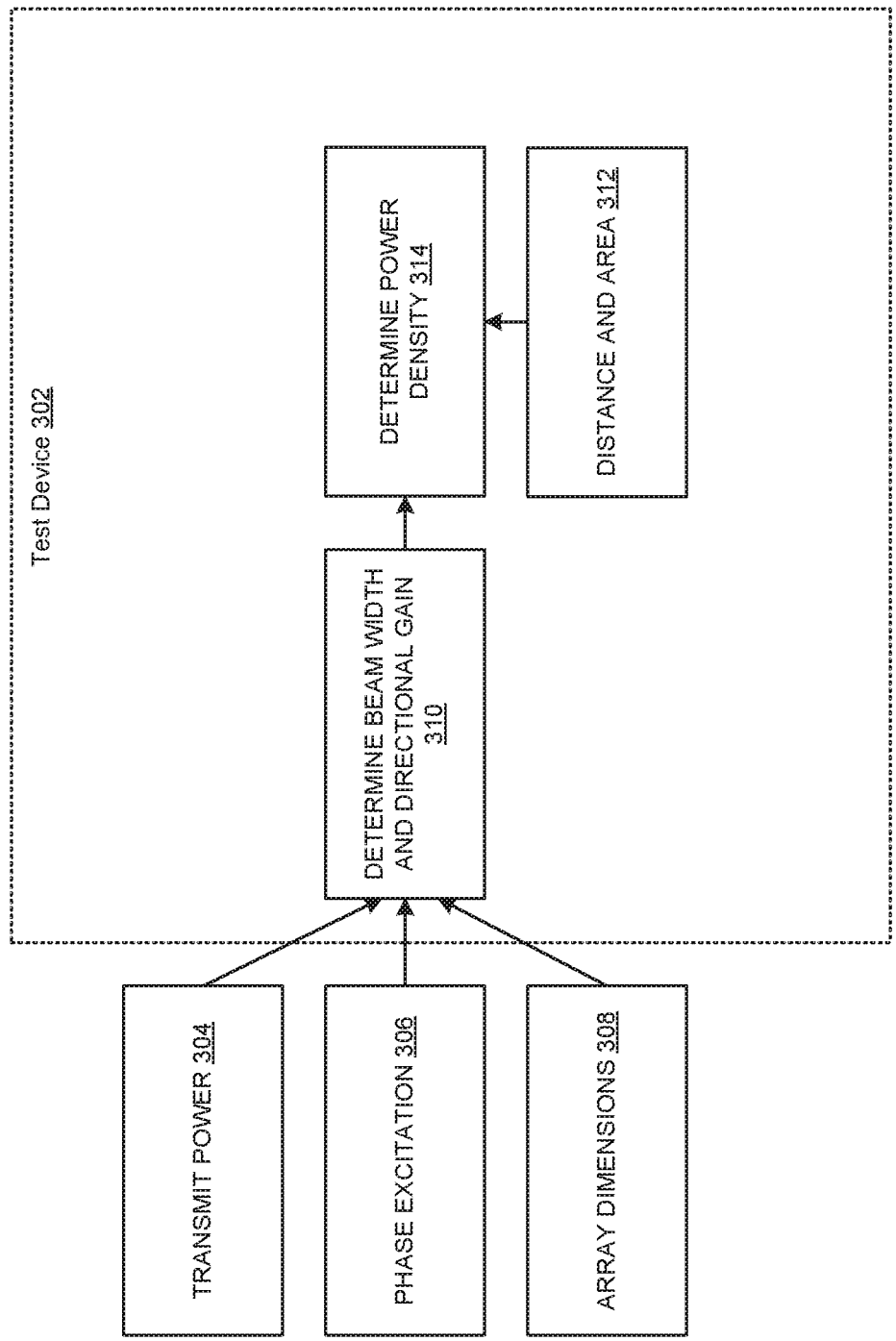
FIG. 3A depicts an illustrative process for determining a maximum power density, in accordance with one or more example embodiments of the present disclosure.

FIG. 3A depicts an illustrative process 300 for determining a maximum power density, in accordance with one or more example embodiments of the present disclosure.

Referring to FIG. 3A, a test device 302 may receive data such as transmit power 304, phase excitation 306, and/or antenna array dimensions 308. Using the received data, test device 302 may determine a beam width and directional gain at block 310. Based on the beam width and directional gain and on a distance and area 312 (e.g., distance of a scanning plane and/or scanning plane area), test device 302 may determine a maximum power density at block 314.

In one or more embodiments, an antenna beam of a transmitting device may be steered in a direction (e.g., θ, φ) by exciting various phase combinations of a phased array antenna.

In one or more embodiments, test device 302 and/or another device may scan a plane orthogonal to the antenna beam direction at a fixed output power and distance along the antenna beam direction.

In one or more embodiments, beam directions may be steered and the scanning of the orthogonal plane may be performed such that all directions which antenna beams may cover with transmissions are scanned in a sufficient number of directions and distances. This way, a sufficient number of transmission output data may be determined by test device 302 to construct a regression relationship between transmission output power and maximum power density at a given distance in any beam direction. Data relating transmission output power to power density may be stored in a look-up table.

In one or more embodiments, given a beam direction, a distance of a transmitting device, and a transmission power level, a maximum power density may be estimated based on a determined relationship between transmission power and power density, which may be stored in a look-up table.

It is understood that the above descriptions are for purposes of illustration and are not meant to be limiting.

Figure 3B:
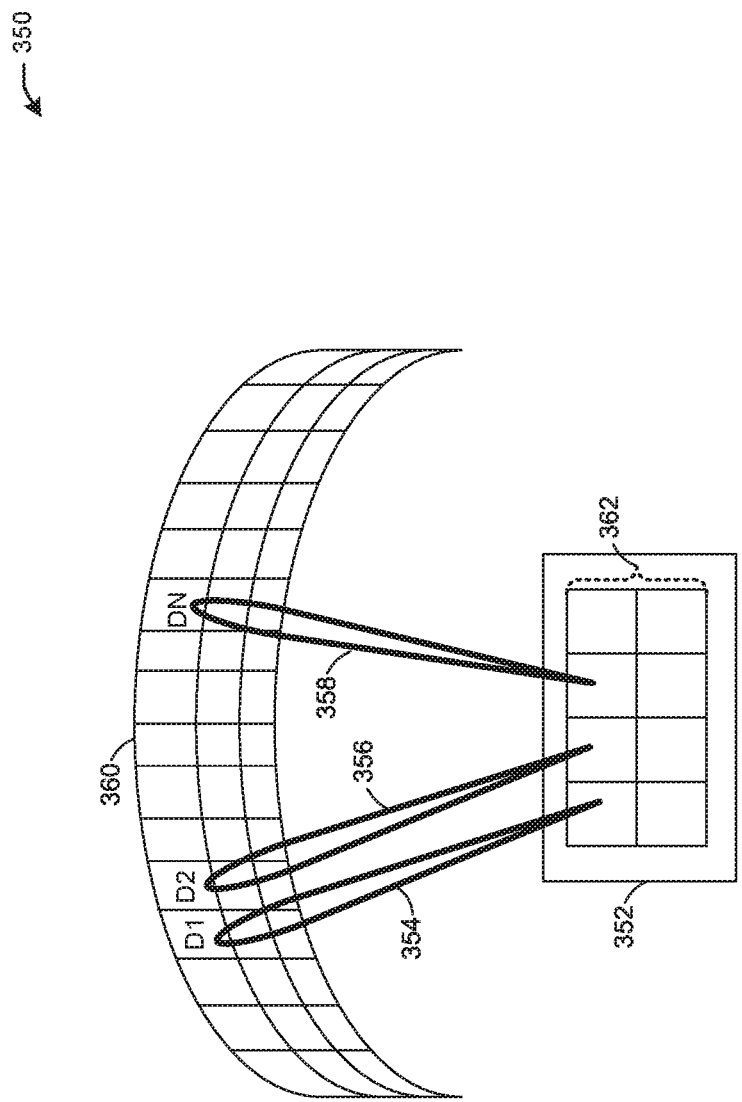
FIG. 3B depicts an illustrative calibration procedure, in accordance with one or more example embodiments of the present disclosure.

FIG. 3B depicts an illustrative calibration procedure 350, in accordance with one or more example embodiments of the present disclosure.

Referring to FIG. 3B, a calibration procedure 350 may include a phased array antenna 352, which may send one or more beams (e.g., beam 354, beam 356, beam 358). Each beam may be sent in a beam direction (e.g., D1, D2, . . . , DN), and received at a plane 360 orthogonal to the transmitted beams.

In one or more embodiments, calibration procedure 350 may allow for an implementation of time-averaging to build a relationship between output power and maximum spatial power density at a specific distance along a beam direction (e.g., θ, φ). For example, beam 354 may be associated with beam direction D1, which may be represented by ($θ_1$, $φ_1$). Beam 356 may be associated with beam direction D2, which may be represented by ($θ_2$, $φ_2$). Beam 358 may be associated with beam direction D3, which may be represented by ($θ_3$, $φ_3$).

In one or more embodiments, a directional space of phased array antenna 352 may be divided into small domains 362, each representing the beam directions D1, D2, . . . , DN, for example. For each beam direction, a calibration measurement may be performed at an antenna output power level at one or more distances from the transmitting phased array antenna 352. Power density may be measured across the plane 360, which may be large enough to capture the maximum radio frequency exposure position of one or more beam directions and may be orthogonal to the direction of a beam.

For example, calibration procedure 350 may be associated with the data collection and calculations of calibration process 200 of FIG. 2A, process 250 for enhanced power management of FIG. 2B, and/or process 300 for determining a maximum power density of FIG. 3A.

Referring to calibration process 200 of FIG. 2A, process 250 for enhanced power management of FIG. 2B, process 300 for determining a maximum power density of FIG. 3A, and/or calibration procedure 350 of FIG. 3B, calibration data may be used to establish a database for an implementation of a time averaging power density algorithm. Directional proximity and/or directional distance information may be provided by one or more methods.

It is understood that the above descriptions are for purposes of illustration and are not meant to be limiting.

Figure 4A:
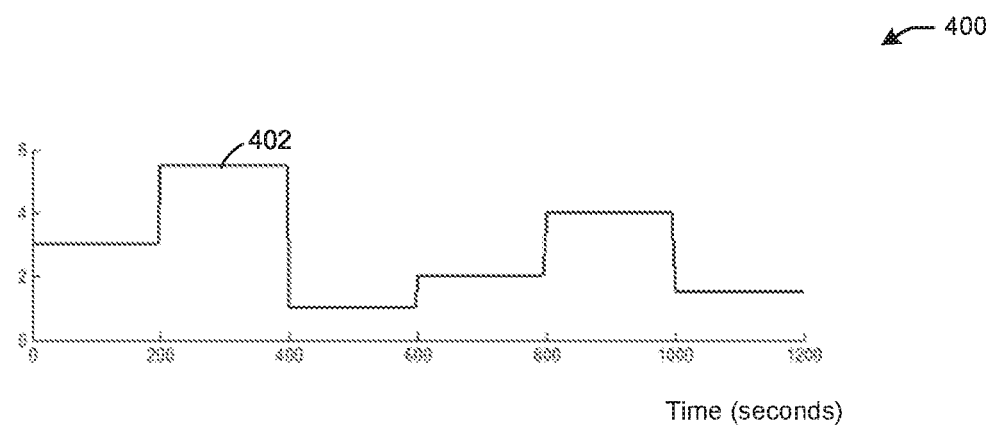
FIG. 4A shows a graph of an antenna distance in a given beam direction, in accordance with one or more example embodiments of the present disclosure.

FIG. 4A shows a graph 400 of an antenna distance in a given beam direction, in accordance with one or more example embodiments of the present disclosure.

Figure 4B:
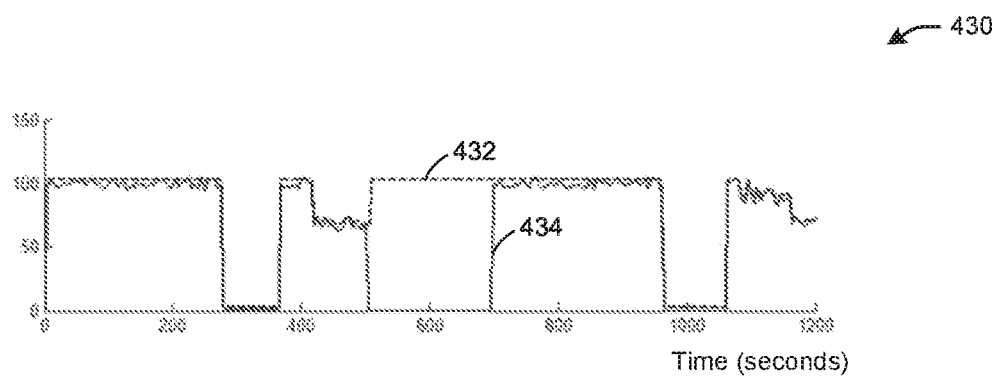
FIG. 4B shows a graph of transmission power of an antenna, in accordance with one or more example embodiments of the present disclosure.

FIG. 4B shows a graph 430 of transmission power of an antenna, in accordance with one or more example embodiments of the present disclosure.

Figure 4C:
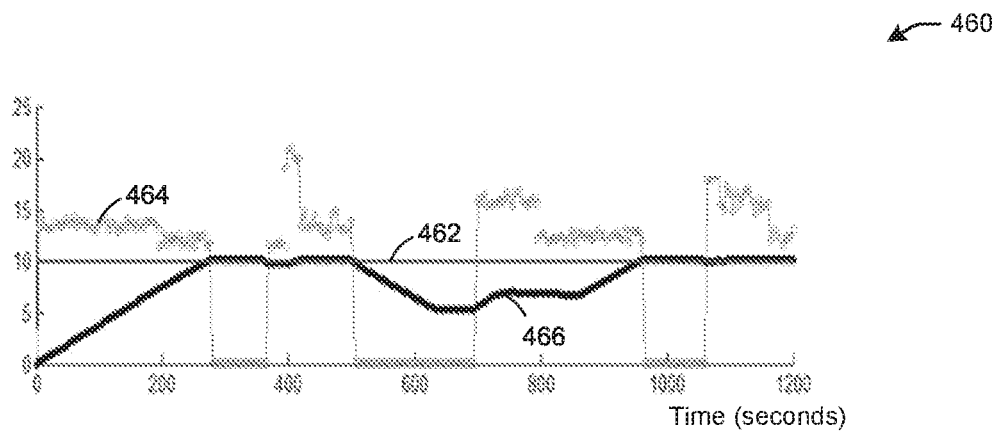
FIG. 4C shows a graph of transmission power density of an antenna, in accordance with one or more example embodiments of the present disclosure.

FIG. 4C shows a graph 460 of transmission power density of an antenna, in accordance with one or more example embodiments of the present disclosure.

Referring to FIG. 4A, a user-antenna distance 402 in a beam direction (e.g., D1 of FIG. 3B) is shown over time (e.g., seconds). The antenna may be a phased array antenna (e.g., phased array antenna 352 of FIG. 3B).

Referring to FIG. 4B, an antenna (e.g., phased array antenna 352 of FIG. 3B) may transmit with a transmission power (e.g., transmission power 432, transmission power 434) over time (e.g., seconds).

Referring to FIG. 4C, an antenna (e.g., phased array antenna 352 of FIG. 3B) may transmit with a transmission power density. Given the antenna distance in FIG. 4A and the antenna transmission power in FIG. 4B, power density may be determined and managed relative to a power density limit 462 (e.g., a regulatory limit). For example, instantaneous power density 464 may at times be above or below the power density limit 462. Based on instantaneous power density 464 over time, an average power density 466 may be maintained and compared to the power density limit 462.

In one or more embodiments, to manage an average power density 466, transmission power may be throttled at times. For example, if instantaneous power density 464 is above power density limit 462, transmission power (e.g., transmission power 434 of FIG. 4B) may be throttled so that instantaneous power density 464 may be low (e.g., zero) for a time, causing average power density 466 to drop and/or stay below power density limit 462. As a transmitter e.g., phased array antenna 352 of FIG. 3B) transmits, a time averaging of power density readings may accumulate. Before the average power density 466 over a time interval (e.g., six minutes) approaches power density limit 462, the transmitter may transmit at a higher power (e.g., than time averaging would allow) than the power density limit 462 (e.g., instantaneous power density 464 may be above power density limit 462). Transmission power throttling may be applied when average power density 466 is close to/above power density limit 462 (e.g., at around 280 seconds in FIG. 4C).

In one or more embodiments, during an idle period of transmission (e.g., between 500-700 seconds), average power density 466 may drop gradually, allowing transmission to continue at a higher (e.g., maximum) power after the idle period ends even though a user body and antenna may be in close proximity (e.g., as measured by a proximity sensor). For example, at around 400 seconds, user-antenna distance 402 may be minimal (e.g., as shown in FIG. 4A), but transmission power may be increased above the level of power density limit 462 in FIG. 4C. Proximity may refer to distances D1, D2, ..., DN of FIG. 3B.

In one or more embodiments, an increase in user-antenna distance (e.g., distances D1, D2, ..., DN of FIG. 3B) may also allow more margin between average power density 466 and power density limit 462. For example, a higher transmission power may be maintained for a short period of time even after a user body approaches an antenna (e.g., at around 400 seconds as shown in FIG. 4A). Throttling may be a control method which allows power density compliance, and throttling may be minimized over time while still maintaining power density compliance with enhanced power management.

It is understood that the above descriptions are for purposes of illustration and are not meant to be limiting.

Figure 5A:
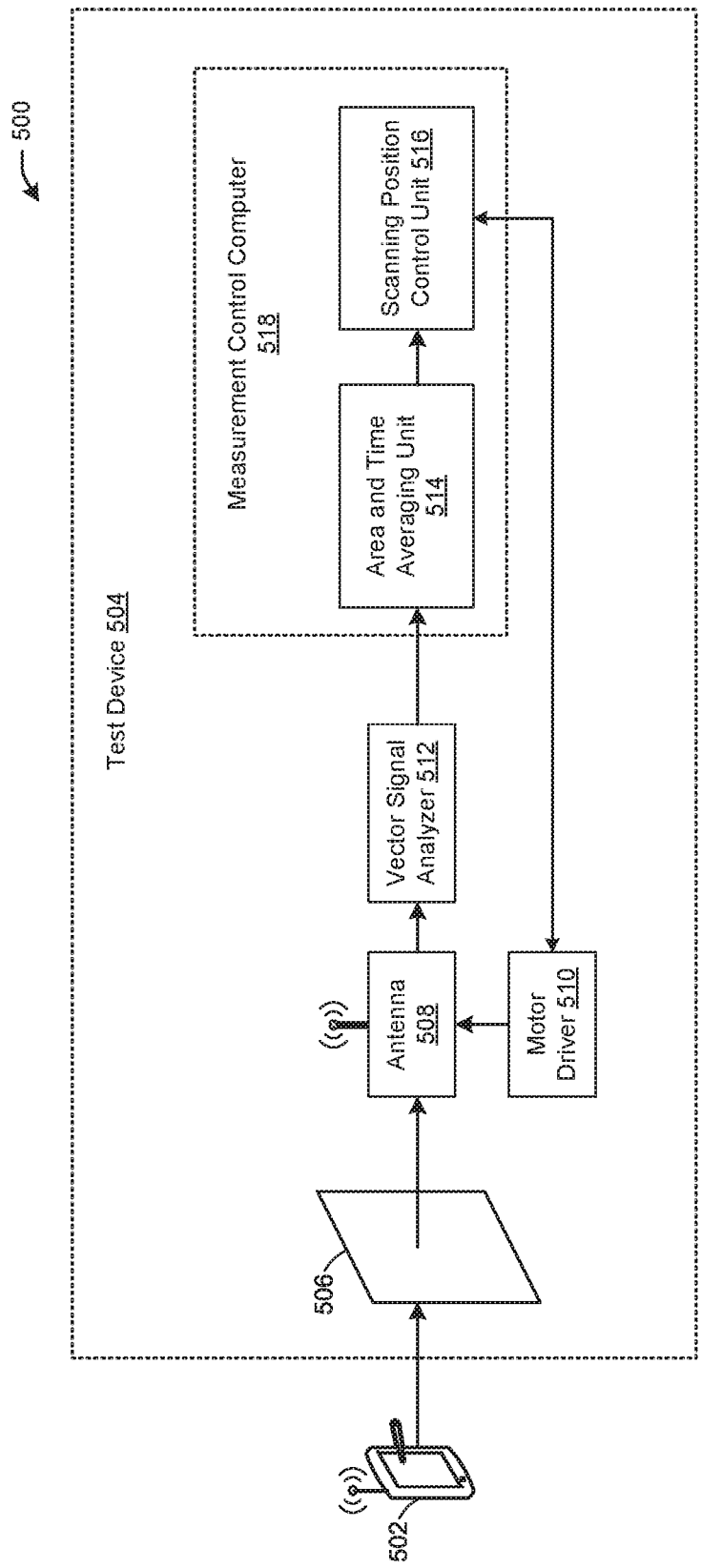
FIG. 5A depicts an illustrative calibration process, in accordance with one or more example embodiments of the present disclosure.

FIG. 5A depicts an illustrative calibration process 500, in accordance with one or more example embodiments of the present disclosure, in accordance with one or more example embodiments of the present disclosure.

Referring to FIG. 5A, there is shown a wireless device 502 under test from a test device 504. Test device 504 may include one or more devices and/or components. For example, test device 504 may include or may be able to measure a scanning plane 506 (e.g., plane 360 of FIG. 3B). Test device 504 may include antenna 508 (e.g., a horn antenna), which may be in communication with a motor driver 510 (e.g., a stepper motor driver). Test device 504 may include a vector signal analyzer 512 to receive signal data from antenna 508. Test device 504 may include an area and time averaging unit 514 and a scanning position control unit 516. Time averaging unit 514 and a scanning position control unit 516 may be associated with a measurement control computer 518 of test device 504. Measurement control computer 518 may receive data from vector signal analyzer 512 and/or motor driver 510 and may determine area and time averages of power density (e.g., at area and time averaging unit 514), and may make sure that all positions across one or more planes are scanned for transmission data (e.g., scanning position control unit 516).

In one or more embodiments, a benefit of radio frequency exposure testing using calibration process 500 may allow for an adequate operating margin (e.g., operating power density in comparison with power density limits) for shipping radio frequency transceivers to use in a range of geographies and in high-powered applications and devices.

It is understood that the above descriptions are for purposes of illustration and are not meant to be limiting.

Figure 5B:
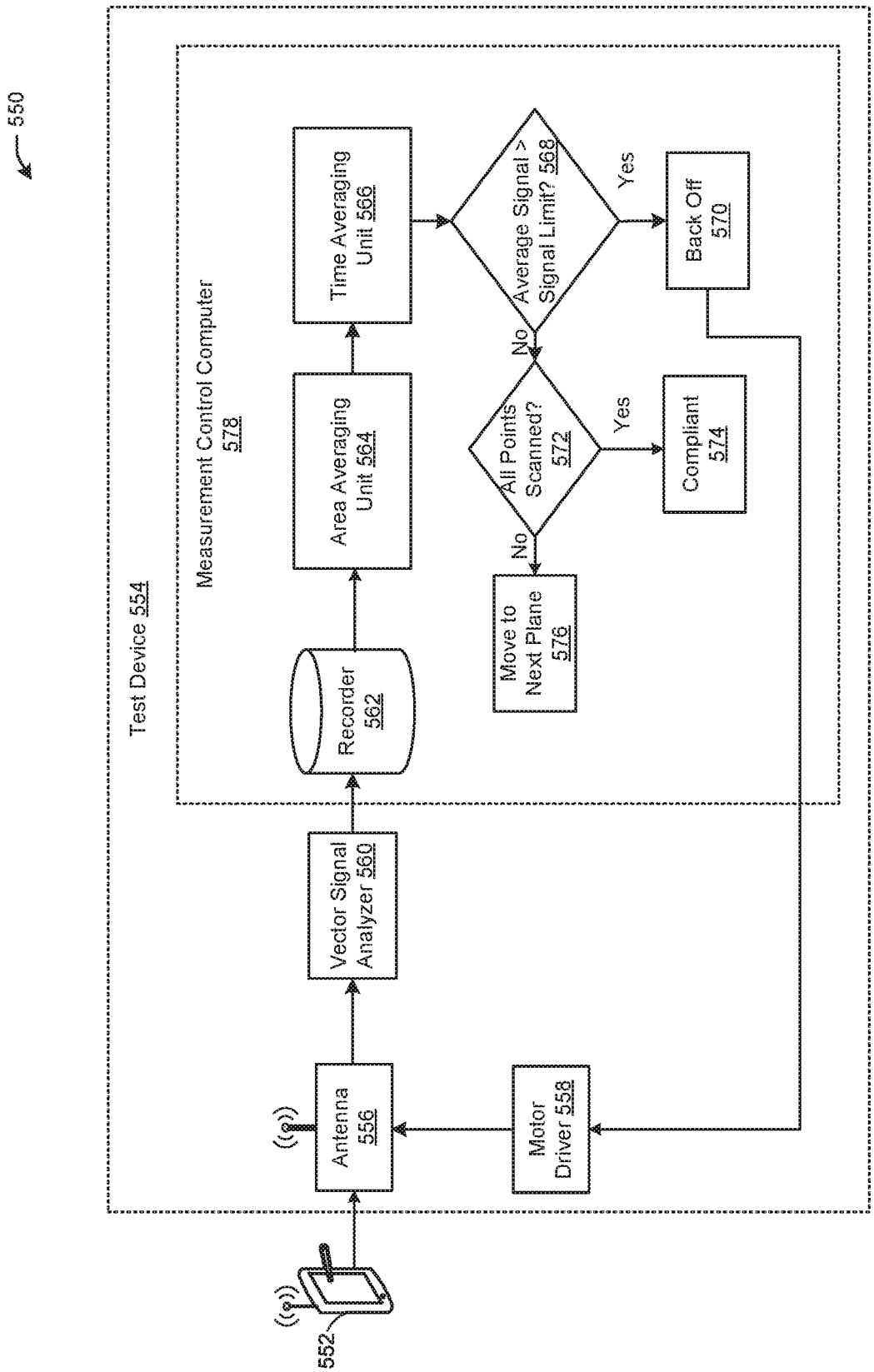
FIG. 5B depicts an illustrative calibration process, in accordance with one or more example embodiments of the present disclosure.

FIG. 5B depicts an illustrative calibration process 550, in accordance with one or more example embodiments of the present disclosure, in accordance with one or more example embodiments of the present disclosure.

Referring to FIG. 5B, there is shown a wireless device 552 under test from a test device 554. Test device 554 may include one or more devices and/or components. For example, test device may include antenna 556 (e.g., a horn antenna), which may be in communication with a motor driver 558 (e.g., a stepper motor driver). Test device 554 may include a vector signal analyzer 560 to receive signal data from antenna 556. Test device 554 may include a recorder 562 (e.g., epoch recorder), which may record transmission data from vector signal analyzer 560. Test device 554 may include an area averaging unit 564, which may receive recorded transmission signal data stored at recorder 562 and may determine an area average of a transmission signal according to the equation:

$$\int\limits_{x,y=0,0}^{x=X\,y=Y} s(x, y, t)dx\, dy = S_{XY},$$

where s(x, y, t) may represent a signal over an x-direction and y-direction over time. Test device 554 may also include a time averaging unit 566 to determine time average of the recorded transmission signals according to the equation:

$$\frac{1}{T}\int\limits_0^T S_{XY} dt = S_{ave},$$

where $S_{ave}$ is a time and area averaged signal. Test device 554 may also determine at box 568 whether an average signal (e.g., $S_{ave}$) is greater than a signal limit (e.g., $S_{limit}$). If $S_{ave}$ is greater than $S_{limit}$, then test device 554 may use box 570 to back off in a direction (e.g., a z-plane direction) by a distance (e.g., 1 centimeter). If $S_{ave}$ is not greater than $S_{limit}$, the test device 554 may determine at box 572 whether all points (e.g., points of plane 360 of FIG. 3B) have been scanned for transmission data. If all points have been scanned for transmission data, then test device 554 may determine at box 574 that wireless device 552 is radio frequency exposure compliant, and measured distance (e.g., z-plane distance) of wireless device 552 may be recorded as compliant. If not all points have been scanned in a plane, then test device 554 may at box 576 move to a next point in the X-Y plane. One or more components of test device 554 may be associated with a measurement control computer 578.

It is understood that the above descriptions are for purposes of illustration and are not meant to be limiting.

Figure 6:
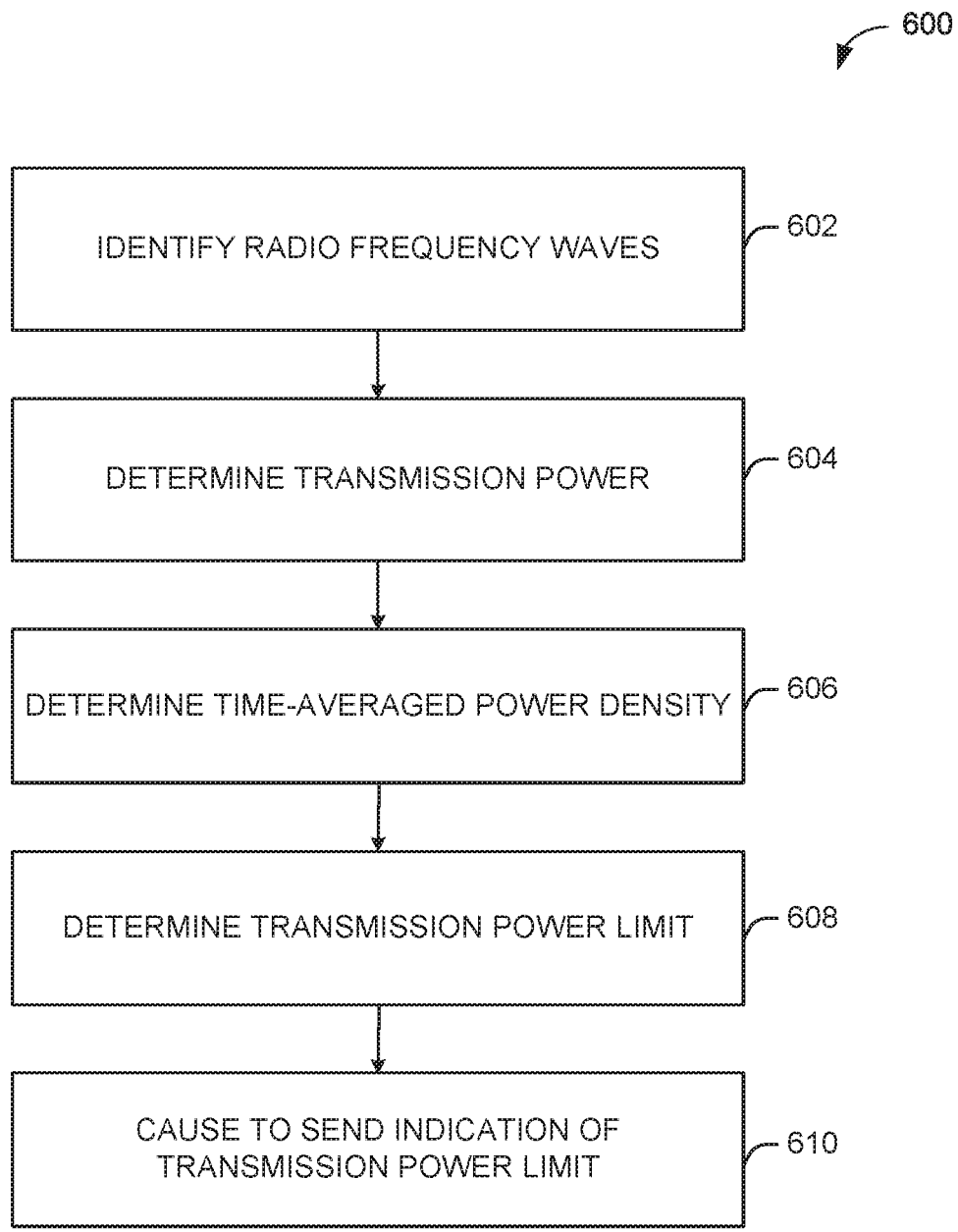
FIG. 6 depicts a flow diagram of an illustrative process for enhanced power management, in accordance with one or more example embodiments of the present disclosure.

FIG. 6 illustrates a flow diagram of illustrative process 600 for enhanced power management, in accordance with one or more example embodiments of the present disclosure.

At block 602, one or more processors of a device (e.g., the user device(s) 120 and/or the AP 102 of FIG. 1) may identify one or more radio frequency waves received from another device during a time period. The time period may be used to determine a time-averaged power density, which may represent an average power density during the time period. The device receiving the radio frequency waves may be a test device or associated with a test device, and the device sending the radio frequency waves may be a device under test.

At block 604, one or more processors of the device may determine transmission power associated with the received radio frequency waves. For example, any individual radio frequency wave at a given time, distance, and/or beam direction may be associated with a transmission power, and the device may determine an individual transmission power of a radio frequency wave. Radio frequency waves transmitted on different beams may each be measured for transmission power. Each transmission power value may be associated with a power density value, which may be found in a stored look-up table.

At block 606, one or more processors of the device may determine a time-averaged power density associated with one or more radio frequency waves. The time-averaged power density may be determined using a transmission power, a distance of the transmitting device (e.g., from an orthogonal plane), and/or a beam direction. Power density may be related to a transmission power, and the corresponding power density and transmission power values may be stored in a look-up table on the device. Knowing the transmission power, a device may determine a corresponding power density. To determine the time-averaged power density, the device may consider the power density over the time period, and may compare the time-averaged power density to a power density limit (e.g., a regulatory limit). A time-averaged power density may be determined for one or more sets of radio frequency waves. If the time-averaged power density is greater than a power density limit, then a new maximum transmission power limit may be determined. If the time-averaged power density is less than or equal to a power density limit, the transmitting device may continue to transmit without throttling transmission power, for example.

At block 608, one or more processors of the device may determine a transmission power limit. If the time-averaged power density is greater than a power density limit, then the transmission power limit may be determined. The transmission power limit may be implemented so that the transmitting device does not transmit at a transmission power that results in a time-averaged power density being non-compliant with a regulatory limit. For example, a transmission power limit may be adopted by a transmitting device to prevent the device from transmitting at a power density level which is too high. The transmission power limit may be lower than the transmission power that the transmitting device was transmitting during the time over which the time-averaged power density was determined. The transmission power limit may be determined based on an instantaneous power density of a radio frequency wave at a given time (e.g., at the beginning of an averaging time window $T_0-T$), and may account for device distance along a beam direction.

At block 610, one or more processors of the device may cause the device to send an indication of the transmission power limit to the second device (e.g., the transmitting device under test). The indication may alert the transmitting device of the transmission power limit so that the transmitting device may implement the transmission power limit, which may allow the transmitting device to reduce power density to comply with regulatory power density limits. The transmission power limit may also be stored in a look-up table for the device for future determination of power density limits given a time-averaged power density of the transmitting device.

It is understood that the above descriptions are for purposes of illustration and are not meant to be limiting.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2A, 2B, 3A, 3B, 4A, 4B, 4C, 5A, 5B, and 6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), enhanced power management device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced power management device 819 may carry out or perform any of the operations and processes (e.g., process 600 of FIG. 6) described and shown above.

In one or more embodiments, enhanced power management device 819 may identify one or more first radio frequency waves received from a second device during a time period; determine a first transmission power associated with a first radio frequency wave of the one or more first radio frequency waves; determine, using the first transmission power, a time-averaged power density associated with the one or more first radio frequency waves; determine a transmission power limit using the time-averaged power density; and cause to send an indication of the transmission power limit to the second device. The enhanced power management device 819 may determine the transmission power limit using the first power density and a distance between the device and the second device. The enhanced power management device 819 may determine that the time-averaged power density is greater than a second transmission power limit. Determining a transmission power limit may include determining a direction of a beam associated with the one or more first radio frequency waves, determining a distance between the second device and an orthogonal plane where the one or more first radio frequency waves are received, and determining the transmission power limit using the direction, the distance, the first transmission power, and a look-up table. The enhanced power management device 819 may identify the time-averaged power density from a look-up table using the first transmission power. The enhanced power management device 819 may identify one or more second radio frequency waves sent by the second device using a second beam, determine, using a second transmission power associated with the one or more second radio frequency waves, a second time-averaged power density associated with the one or more second radio frequency waves, determine a second transmission power limit using the second transmission power, and cause to send a second indication of the second transmission power limit to the second device. The enhanced power management device 819 may identify one or more second radio frequency waves sent by the second device using a second beam, and determine, using the first transmission power and a second transmission power associated with the one or more second radio frequency waves, the time-averaged power density. The enhanced power management device 819 may identify one or more second radio frequency waves sent by the second device using a second beam, determine, using a second transmission power associated with the one or more second radio frequency waves, a second time-averaged power density associated with the one or more second radio frequency waves, and determine that the second time-averaged power density is within a second transmission power limit.

In one or more embodiments, the enhanced power management device 819 may identify one or more first radio frequency waves received from a second device during a time period, determine a first transmission power associated with a first radio frequency wave of the one or more first radio frequency waves, determine, using the first transmission power, a time-averaged power density associated with the one or more first radio frequency waves, determine a transmission power limit using the time-averaged power density, and cause to send an indication of the transmission power limit to the second device.

It is understood that the above are only a subset of what the enhanced power management device 819 may be configured to perform and that other functions included throughout this disclosure may also be performed by the enhanced power management device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device, the device comprising memory and processing circuitry configured to: identify one or more first radio frequency waves received from a second device during a time period; determine a first transmission power associated with a first radio frequency wave of the one or more first radio frequency waves; determine, using the first transmission power, a time-averaged power density associated with the one or more first radio frequency waves; determine a transmission power limit using the time-averaged power density; and cause to send an indication of the transmission power limit to the second device.

Example 2 may include the device of example 1 and/or some other example herein, wherein the first transmission power is associated with a first power density, and wherein to determine the transmission power limit comprises the memory and the processing circuitry being further configured to determine the transmission power limit using the first power density and a distance between the device and the second device.

Example 3 may include the device of example 1 and/or some other example herein, wherein to determine the transmission power limit comprises the memory and the processing circuitry being further configured to determine that the time-averaged power density is greater than a second transmission power limit.

Example 4 may include the device of example 1 and/or some other example herein, wherein to determine the transmission power limit comprises the memory and the processing circuitry being further configured to: determine a direction of a beam associated with the one or more first radio frequency waves; determine a distance between the second device and an orthogonal plane where the one or more first radio frequency waves are received; and determine the transmission power limit using the direction, the distance, the first transmission power, and a look-up table.

Example 5 may include the device of example 1 and/or some other example herein, wherein to determine the time-averaged power density comprises the memory and the processing circuitry being further configured to identify the time-averaged power density from a look-up table using the first transmission power.

Example 6 may include the device of example 1 and/or some other example herein, wherein the one or more first radio frequency waves are sent by the second device using a first beam, wherein the time-averaged power density is a first time-averaged power density associated with the first beam, and wherein the memory and processing circuitry are further configured to: identify one or more second radio frequency waves sent by the second device using a second beam; determine, using a second transmission power associated with the one or more second radio frequency waves, a second time-averaged power density associated with the one or more second radio frequency waves; determine a second transmission power limit using the second transmission power; and cause to send a second indication of the second transmission power limit to the second device.

Example 7 may include the device of example 1 and/or some other example herein, wherein the one or more first radio frequency waves are sent by the second device using a first beam, and wherein the memory and processing circuitry are further configured to identify one or more second radio frequency waves sent by the second device using a second beam, wherein to determine the time-averaged power density comprises to determine, using the first transmission power and a second transmission power associated with the one or more second radio frequency waves, the time-averaged power density, and wherein the time-averaged power density is associated with the one or more first radio frequency waves and with the one or more second radio frequency waves.

Example 8 may include the device of example 1 and/or some other example herein, wherein the one or more first radio frequency waves are sent by the second device using a first beam, wherein the time-averaged power density is a first time-averaged power density associated with the first beam, and wherein the memory and processing circuitry are further configured to: identify one or more second radio frequency waves sent by the second device using a second beam; determine, using a second transmission power associated with the one or more second radio frequency waves, a second time-averaged power density associated with the one or more second radio frequency waves; and determine that the second time-averaged power density is within a second transmission power limit.

Example 9 may include the device of example 1 and/or some other example herein, further comprising a transceiver configured to transmit and receive wireless signals.

Example 10 may include the device of example 9 and/or some other example herein, further comprising one or more antennas coupled to the transceiver.

Example 11 may include a non-transitory computer-readable medium storing computer-executable instructions which when executed by one or more processors result in performing operations comprising: identifying, by a first device, one or more first radio frequency waves received from a second device during a time period; determining a first transmission power associated with a first radio frequency wave of the one or more first radio frequency waves; determining, using the first transmission power, a time-averaged power density associated with the one or more first radio frequency waves; determining a transmission power limit using the time-averaged power density; and causing to send an indication of the transmission power limit to the second device.

Example 12 may include the non-transitory computer-readable medium of example 11 and/or some other example herein, wherein the first transmission power is associated with a first power density, and wherein determining the transmission power limit comprises determining the transmission power limit using the first power density and a distance between the first device and the second device.

Example 13 may include the non-transitory computer-readable medium of example 11 and/or some other example herein, wherein the first transmission power is associated with a first power density, and wherein determining the transmission power limit comprises determining the transmission power limit using the first power density and a distance between the first device and the second device.

Example 14 may include the non-transitory computer-readable medium of example 11 and/or some other example herein, wherein determining the transmission power limit comprises determining that the time-averaged power density is greater than a second transmission power limit.

Example 15 may include the non-transitory computer-readable medium of example 11 and/or some other example herein, wherein determining the time-averaged power density comprises identifying the time-averaged power density from a look-up table using the first transmission power.

Example 16 may include the non-transitory computer-readable medium of example 11 and/or some other example herein, wherein the one or more first radio frequency waves are sent by the second device using a first beam, and wherein the time-averaged power density is a first time-averaged power density associated with the first beam, the operations further comprising: identifying one or more second radio frequency waves sent by the second device using a second beam; determining, using a second transmission power associated with the one or more second radio frequency waves, a second time-averaged power density associated with the one or more second radio frequency waves; determining a second transmission power limit using the second transmission power; and causing to send a second indication of the second transmission power limit to the second device.

Example 17 may include the non-transitory computer-readable medium of example 11 and/or some other example herein, wherein the one or more first radio frequency waves are sent by the second device using a first beam, the operations further comprising identifying one or more second radio frequency waves sent by the second device using a second beam, wherein determining the time-averaged power density comprises determining, using the first transmission power and a second transmission power associated with the one or more second radio frequency waves, the time-averaged power density, and wherein the time-averaged power density is associated with the one or more first radio frequency waves and with the one or more second radio frequency waves.

Example 18 may include the non-transitory computer-readable medium of example 11 and/or some other example herein, wherein the one or more first radio frequency waves are sent by the second device using a first beam, and wherein the time-averaged power density is a first time-averaged power density associated with the first beam, the operations further comprising: identifying one or more second radio frequency waves sent by the second device using a second beam; determining, using a second transmission power associated with the one or more second radio frequency waves, a second time-averaged power density associated with the one or more second radio frequency waves; and determining that the second time-averaged power density is within a second transmission power limit.

Example 19 may include the non-transitory computer-readable medium of example 11 and/or some other example herein, wherein determining the transmission power limit comprises: determining a direction of a beam associated with the one or more first radio frequency waves; determining a distance between the second device and an orthogonal plane where the one or more first radio frequency waves are received; and determining the transmission power limit using the direction, the distance, the first transmission power, and a look-up table.

Example 20 may comprise a method comprising: identifying, by one or more processors of a first device, one or more first radio frequency waves received from a second device during a time period; determining a first transmission power associated with a first radio frequency wave of the one or more first radio frequency waves; determining, using the first transmission power, a time-averaged power density associated with the one or more first radio frequency waves; determining a transmission power limit using the time-averaged power density; and causing to send an indication of the transmission power limit to the second device.

Example 21 may include the method of example 20 and/or some other example herein, wherein determining the time-averaged power density comprises: determining a first power density associated with the first transmission power; and determining the time-averaged power density using the first power density.

Example 22 may include the method of example 20 and/or some other example herein, wherein the first transmission power is associated with a first power density, and wherein determining the transmission power limit comprises determining the transmission power limit using the first power density and a distance between the first device and the second device.

Example 23 may include the method of example 20 and/or some other example herein, wherein determining the transmission power limit comprises determining that the time-averaged power density is greater than a second transmission power limit.

Example 24 may include the method of example 20 and/or some other example herein, wherein determining the transmission power limit comprises: determining a direction of a beam associated with the one or more first radio frequency waves; determining a distance between the second device and an orthogonal plane where the one or more first radio frequency waves are received; and determining the transmission power limit using the direction, the distance, the first transmission power, and a look-up table.

Example 25 may include the method of example 20 and/or some other example herein, wherein determining the time-averaged power density comprises identifying the time-averaged power density from a look-up table using the first transmission power.

Example 26 may include the method of example 20 and/or some other example herein, wherein the one or more first radio frequency waves are sent by the second device using a first beam, wherein the time-averaged power density is a first time-averaged power density associated with the first beam, further comprising: identifying one or more second radio frequency waves sent by the second device using a second beam; determining, using a second transmission power associated with the one or more second radio frequency waves, a second time-averaged power density associated with the one or more second radio frequency waves; determining a second transmission power limit using the second transmission power; and causing to send a second indication of the second transmission power limit to the second device.

Example 27 may include the method of example 20 and/or some other example herein, wherein the one or more first radio frequency waves are sent by the second device using a first beam, further comprising identifying one or more second radio frequency waves sent by the second device using a second beam, wherein determining the time-averaged power density comprises determining, using the first transmission power and a second transmission power associated with the one or more second radio frequency waves, the time-averaged power density, and wherein the time-averaged power density is associated with the one or more first radio frequency waves and with the one or more second radio frequency waves.

Example 28 may include the method of example 20 and/or some other example herein, wherein the one or more first radio frequency waves are sent by the second device using a first beam, wherein the time-averaged power density is a first time-averaged power density associated with the first beam, further comprising: identifying one or more second radio frequency waves sent by the second device using a second beam; determining, using a second transmission power associated with the one or more second radio frequency waves, a second time-averaged power density associated with the one or more second radio frequency waves; and determining that the second time-averaged power density is within a second transmission power limit.

Example 29 may comprise an apparatus comprising: means for identifying, by a first device, one or more first radio frequency waves received from a second device during a time period; means for determining a first transmission power associated with a first radio frequency wave of the one or more first radio frequency waves; means for determining, using the first transmission power, a time-averaged power density associated with the one or more first radio frequency waves; means for determining a transmission power limit using the time-averaged power density; and means for causing to send an indication of the transmission power limit to the second device.

Example 30 may include the apparatus of example 29 and/or some other example herein, wherein the first transmission power is associated with a first power density, and wherein determining the transmission power limit comprises determining the transmission power limit using the first power density and a distance between the first device and the second device.

Example 31 may include the apparatus of example 29 and/or some other example herein, wherein the first transmission power is associated with a first power density, and wherein determining the transmission power limit comprises determining the transmission power limit using the first power density and a distance between the first device and the second device.

Example 32 may include the apparatus of example 29 and/or some other example herein, wherein determining the transmission power limit comprises determining that the time-averaged power density is greater than a second transmission power limit.

Example 33 may include the apparatus of example 29 and/or some other example herein, wherein determining the time-averaged power density comprises identifying the time-averaged power density from a look-up table using the first transmission power.

Example 34 may include the apparatus of example 29 and/or some other example herein, wherein the one or more first radio frequency waves are sent by the second device using a first beam, and wherein the time-averaged power density is a first time-averaged power density associated with the first beam, the operations further comprising: means for identifying one or more second radio frequency waves sent by the second device using a second beam; means for determining, using a second transmission power associated with the one or more second radio frequency waves, a second time-averaged power density associated with the one or more second radio frequency waves; means for determining a second transmission power limit using the second transmission power; and means for causing to send a second indication of the second transmission power limit to the second device.

Example 35 may include the apparatus of example 29 and/or some other example herein, wherein the one or more first radio frequency waves are sent by the second device using a first beam, the operations further comprising identifying one or more second radio frequency waves sent by the second device using a second beam, wherein determining the time-averaged power density comprises determining, using the first transmission power and a second transmission power associated with the one or more second radio frequency waves, the time-averaged power density, and wherein the time-averaged power density is associated with the one or more first radio frequency waves and with the one or more second radio frequency waves.

Example 36 may include the apparatus of example 29 and/or some other example herein, wherein the one or more first radio frequency waves are sent by the second device using a first beam, and wherein the time-averaged power density is a first time-averaged power density associated with the first beam, the operations further comprising: means for identifying one or more second radio frequency waves sent by the second device using a second beam; means for determining, using a second transmission power associated with the one or more second radio frequency waves, a second time-averaged power density associated with the one or more second radio frequency waves; and means for determining that the second time-averaged power density is within a second transmission power limit.

Example 37 may include the apparatus of example 29 and/or some other example herein, wherein determining the transmission power limit comprises: means for determining a direction of a beam associated with the one or more first radio frequency waves; means for determining a distance between the second device and an orthogonal plane where the one or more first radio frequency waves are received; and means for determining the transmission power limit using the direction, the distance, the first transmission power, and a look-up table.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   determine, during a calibration process for the device, a first transmission power associated with one or more first radio frequency waves;
   determine, during the calibration process, based on a first antenna direction, a first distance between the device and a second device or an object;
   determine, based on the first transmission power and the first distance, a first radio frequency power density of the one or more first radio frequency waves during the calibration process;
   generate, during the calibration process, based on the first transmission power, the first distance, and the first radio frequency power density, a table indicating associations between transmission power, antenna direction, and radio frequency power density;

store the table in the device;

determine a second transmission power associated with one or more second radio frequency waves transmitted using a second antenna direction during a time period unassociated with the calibration process;

determine, based on the table, an association between the second transmission power, the second antenna direction, and a second radio frequency power density for the time period;

determine, based on the second radio frequency power density and the time period, a time-averaged radio frequency power density associated with the one or more second radio frequency waves;

determine, based on one or more transmission power limits and the time-averaged radio frequency power density, a third transmission power; and cause to send one or more second radio frequency waves based on the third transmission power.

2. The device of claim 1, wherein the processing circuitry is configured to determine a first transmission power limit of the one or more transmission power limits based on the time-averaged radio frequency power density.

3. The device of claim 1, wherein to determine the third second transmission power comprises the processing circuitry being further configured to determine that the time-averaged radio frequency power density is greater than a first transmission power limit of the one or more transmission power limits.

4. The device of claim 1, wherein the first distance and the first antenna direction are associated with a beam associated with the one or more first radio frequency waves,
wherein the processing circuitry is further configured to determine a first transmission power limit of the one or more transmission power limits using the first antenna direction, the first distance, the first transmission power, and the table.

5. The device of claim 1, wherein to determine the time-averaged radio frequency power density comprises the processing circuitry being further configured to identify the time-averaged radio frequency power density from the table using the first transmission power.

6. The device of claim 1, wherein the one or more first radio frequency waves are sent using a first beam, wherein the time-averaged radio frequency power density is a first time-averaged radio frequency power density associated with the first beam, wherein the one or more second radio frequency waves are sent using a second beam, and wherein the processing circuitry is further configured to:
determine, using the third transmission power associated with the one or more second radio frequency waves, a second time-averaged radio frequency power density associated with the one or more second radio frequency waves;
determine a second transmission power limit of the one or more transmission power limits using the second transmission power; and
cause to send one or more third radio frequency waves based on a fourth transmission power.

7. The device of claim 1, wherein the one or more first radio frequency waves are sent using a first beam, wherein the time-averaged radio frequency power density is a first time-averaged radio frequency power density associated with the first beam, wherein the one or more second radio frequency waves are sent using a second beam, and wherein the processing circuitry is further configured to:
determine, using the third transmission power, a second time-averaged radio frequency power density associated with the one or more second radio frequency waves; and
determine that the second time-averaged radio frequency power density is within a second transmission power limit of the one or more transmission power limits.

8. The device of claim 1, further comprising a transceiver configured to transmit and receive wireless signals comprising the one or more first radio frequency waves and the one or more second radio frequency waves.

9. The device of claim 8, further comprising one or more antennas coupled to the transceiver.

10. The device of claim 1, wherein the processing circuitry is further configured to:
determine, based on a second antenna direction, a second distance between the device and the second device or the object; and
determine, based on a third transmission power and the second distance, a second radio frequency power density.

11. A non-transitory computer-readable medium storing computer-executable instructions which when executed by one or more processors result in performing operations comprising:
determining, by a first device, during a calibration process for the first device, a first transmission power associated with one or more first radio frequency waves;
determining, during the calibration process, based on a first antenna direction, a first distance between the first device and a second device or an object;
determining, based on the first transmission power and the first distance, a first radio frequency power density of the one or more first radio frequency waves during the calibration process;
generating, during the calibration process, based on the first transmission power, the first distance, and the first radio frequency power density, a table indicating associations between transmission power, antenna direction, and radio frequency power density;
storing the table in the device;
determining a second transmission power associated with one or more second radio frequency waves transmitted using a second antenna direction during a time period unassociated with the calibration process;
determining, based on the table, an association between the second transmission power, the second antenna direction, and a second radio frequency power density for the time period;
determining, based on the second radio frequency power density and the time period, a time-averaged radio frequency power density associated with the one or more second radio frequency waves;
determining, based on one or more transmission power limits and the time-averaged radio frequency power density, a third transmission power; and
causing to send one or more second radio frequency waves based on the third transmission power.

12. The non-transitory computer-readable medium of claim 11, the operations further comprising determining a first transmission power limit of the one or more transmission power limits based on the time-averaged radio frequency power density.

13. The non-transitory computer-readable medium of claim 11, wherein determining the time-averaged radio frequency power density comprises identifying the time-averaged radio frequency power density from the table using the first transmission power.

14. The non-transitory computer-readable medium of claim 11, wherein the one or more first radio frequency waves are sent using a first beam, wherein the time-averaged radio frequency power density is a first time-averaged radio frequency power density associated with the first beam, and wherein the one or more second radio frequency waves are sent using a second beam, the operations further comprising:
   determining, using the third transmission power associated with the one or more second radio frequency waves, a second time-averaged radio frequency power density associated with the one or more second radio frequency waves;
   determining a second transmission power limit of the one or more transmission power limits using the second transmission power; and
   causing to send one or more third radio frequency waves based on a fourth transmission power.

15. The non-transitory computer-readable medium of claim 11, wherein the one or more first radio frequency waves are sent using a first beam, wherein the time-averaged radio frequency power density is a first time-averaged radio frequency power density associated with the first beam, and wherein the one or more second radio frequency waves are sent using a second beam, the operations further comprising:
   determining, using the third transmission power, a second time-averaged radio frequency power density associated with the one or more second radio frequency waves; and
   determining that the second time-averaged radio frequency power density is within a second transmission power limit of the one or more transmission power limits.

16. The non-transitory computer-readable medium of claim 11, the operations further comprising:
   determining, based on a second antenna direction, a second distance between the first device and the second device or the object; and
   determining, based on a third transmission power and the second distance, a second radio frequency power density.

17. A method comprising:
   determining, by at least one processor of a first device, during a calibration process for the device, a first transmission power associated with one or more first radio frequency waves;
   determining, during the calibration process, based on a first antenna direction, a first distance between the device and a second device or an object;
   determining, based on the first transmission and the first distance, a first radio frequency power density associated with the one or more first radio frequency waves during the calibration process;
   generating, during the calibration process, based on the first transmission power, the first distance, and the first radio frequency power density, a table indicating associations between transmission power, antenna direction, and radio frequency power density;
   storing the table in the device;
   determining a second transmission power associated with one or more second radio frequency waves transmitted using a second antenna direction during a time period unassociated with the calibration process;
   determining, based on the table, an association between the second transmission power, the second antenna direction, and a second radio frequency power density for the time period;
   determining, based on the second radio frequency power density and the time period, a time-averaged radio frequency power density associated with the one or more second radio frequency waves;
   determining, based on one or more a transmission power limits and using the time-averaged radio frequency power density, a third transmission power; and
   causing to send one or more second radio frequency waves based on the third transmission power.

18. The method of claim 17, further comprising determining a first transmission power limit of the one or more transmission power limits based on the time-averaged radio frequency power density.

19. The method of claim 17, further comprising:
   determining, based on a second antenna direction, a second distance between the device and the second device or the object; and
   determining, based on a third transmission power and the second distance, a second radio frequency power density.

* * * * *